United States Patent
Wang et al.

(10) Patent No.: US 8,665,702 B2
(45) Date of Patent: Mar. 4, 2014

(54) METHOD AND SYSTEM FOR REFRESHING THE SINGLE RING ADDRESS IN AN ETHERNET RING

(75) Inventors: Bin Wang, Shenzhen (CN); Shaoyong Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 152 days.

(21) Appl. No.: 13/259,797

(22) PCT Filed: Oct. 14, 2009

(86) PCT No.: PCT/CN2009/074433
§ 371 (c)(1),
(2), (4) Date: Sep. 23, 2011

(87) PCT Pub. No.: WO2011/000184
PCT Pub. Date: Jun. 1, 2011

(65) Prior Publication Data
US 2012/0099423 A1    Apr. 26, 2012

(30) Foreign Application Priority Data

Jul. 3, 2009   (CN) .......................... 2009 1 0088503

(51) Int. Cl.
*H04L 12/437* (2006.01)
*H04L 12/42* (2006.01)

(52) U.S. Cl.
USPC ........... 370/217; 370/222; 370/258; 370/252; 370/406

(58) Field of Classification Search
USPC ......... 370/216–217, 218, 219–220, 221, 222, 370/223, 224, 252, 255, 258, 395.53; 709/224
See application file for complete search history.

(56) References Cited

U.S. PATENT DOCUMENTS

| | | | |
|---|---|---|---|
| 6,751,189 B1 * | 6/2004 | Gullicksen et al. | 370/216 |
| 7,181,534 B2 * | 2/2007 | Semaan et al. | 709/245 |
| 7,339,887 B2 * | 3/2008 | Griswold et al. | 370/216 |
| 7,599,315 B2 * | 10/2009 | Cornet et al. | 370/258 |
| 7,688,716 B2 * | 3/2010 | Pande et al. | 370/222 |
| 7,856,019 B2 * | 12/2010 | Shah et al. | 370/390 |

(Continued)

FOREIGN PATENT DOCUMENTS

| | | |
|---|---|---|
| CN | 101035047 A | 9/2007 |
| CN | 101426031 A | 5/2009 |
| CN | 101442465 A | 5/2009 |
| EP | 1727313 A1 * | 11/2006 |

OTHER PUBLICATIONS

International Search Report for Application No. PCT/CN2009/074433 dated Apr. 15, 2010.

*Primary Examiner* — Candal Elpenord
(74) *Attorney, Agent, or Firm* — Marshall, Gerstein & Borun LLP; Randall G. Rueth

(57) ABSTRACT

The present invention discloses a method for refreshing a single ring address of an Ethernet ring, which method comprises: achieving address refresh on an on-ring port at one side of a same node by the control of a refresh timer. The present invention further discloses a system for refreshing a single ring address of an Ethernet ring, which system comprises: an address refresh achieving unit configured to achieve address refresh on an on-ring port at one side of a same node by the control of a refresh timer. The method and system of the present invention reduces the number of refreshes of the address forwarding table and improves the efficiency and stability of Ethernet ring protection, thus greatly promoting the performance of the Ethernet ring.

8 Claims, 5 Drawing Sheets

(56) References Cited

U.S. PATENT DOCUMENTS

| | | | |
|---|---|---|---|
| 8,018,842 B2* | 9/2011 | Yoshimaru | 370/223 |
| 8,149,692 B2* | 4/2012 | Holness et al. | 370/222 |
| 2002/0186667 A1* | 12/2002 | Mor et al. | 370/258 |
| 2004/0081083 A1* | 4/2004 | Sekihata | 370/222 |
| 2009/0052317 A1* | 2/2009 | Takagi et al. | 370/223 |
| 2009/0175166 A1* | 7/2009 | Long et al. | 370/225 |
| 2009/0207726 A1* | 8/2009 | Thomson et al. | 370/216 |
| 2009/0262643 A1* | 10/2009 | Zhao et al. | 370/217 |

* cited by examiner

METHOD AND SYSTEM FOR REFRESHING THE SINGLE RING ADDRESS IN AN ETHERNET RING

CROSS-REFERENCE TO RELATED APPLICATIONS

This is a national phase of International Patent Application No. PCT/CN2009/074433 filed Oct. 14, 2009, which in turn claims the priority benefit of Chinese Patent Application No. 200910088503.8 filed Jul. 3, 2009, the entire respective disclosures of which are incorporated herein by reference.

FIELD OF THE INVENTION

The present invention relates to the data communication field, and in particular to a method and system for refreshing the single ring address of an Ethernet ring.

BACKGROUND OF THE INVENTION

In the practical application of Ethernet, various protection technologies are widely used to achieve the redundancy backup between the master path and standby path. One implementing manner is: when both the master path and standby path are intact, the protected data forwarding function of the standby path is blocked and the protected data between networks is transmitted on the master path. Another implementing manner is: when the master path has malfunction, the protected data forwarding function of the standby path is activated and the protected data between networks is switched onto the standby path to transmit to avoid the repeated receipt of the protected data and the formation of broadcast storm under the normal state of the network. This manner of enabling the standby path to transmit protected data when the master path of the network has malfunction can be used to improve the anti-failure capability of the Ethernet and meet the high instantaneity requirements of the convergence time being smaller than 50 ms during the switch. The implementing manner of the Ethernet ring protection technology will now be described in detail hereinafter.

As shown in FIG. 1, all nodes A to F are nodes which possess the Ethernet exchange function, network M is connected to node B, and network N is connected to node D. Network M communicates with network N. There are two physical paths between network M and network N, i.e. network N<->node D<->node C<->node B<->network M; network N<->node D<->node E<->node F<->node A<->node B<->network M. "e" and "w" in FIG. 1 represent the on-ring ports of each node, and different on-ring ports of the same node are represented by "e" and "w" differentially.

When applying the Ethernet ring protection technology, the ring protection link and control node are generally defined, that is, in the situation that the Ethernet ring is not failed, a link on the ring which blocks the data messages so as to prevent the formation of a ring loop is referred to as ring protection link, and the switch between the master path and standby path of the ring network can be performed by operating this section of ring protection link. A node which has a ring protection link is referred to as a control node or a master node here. As shown in FIG. 2, the Ethernet ring includes nodes A, B, C, D, E, and F and links <A, B>, <B, C>, <C, D>, <D, E>, <E, F>, and <F, A>. Node A is a control node or referred to as a master node, and link <F, A> which is directly connected to the port e of node A is a ring protection link.

When the on-ring links are intact, the control node blocks the data message forwarding function of the ports which are connected to the ring protection link, so there is no ring loop generated in the network, which prevents the broadcast storm caused by network ring loop. As shown in FIG. 2, node A blocks the protected data forwarding function of the port e, and the communication path of network M and network N is: network M<->node B<->node C<->node D<->network N, as shown by the heavy solid lines in FIG. 2.

When a link is failed, the control node activates the data message forwarding function of the port connected to the ring protection link, thus ensuring the connection of services. As shown in FIG. 3, link <B, C> on the ring is failed, and node A activates the data message forwarding function of port e, and the new communication path of network M and network N is: network M<->node B<->node A<->node F<->node E<->node D<->network N, as shown by the heavy lines in FIG. 3.

Actually, when the network topology changes, the nodes on the ring network have to refresh the address forwarding table, which is for preventing the data path from propagating along the path before the topology changes. For example, in FIG. 2, there is no failure on the ring network, and the communication path between network M and network N is network M<->node B<->node C<->node D<->network N. When link <B, C> on the ring network is failed, if the communication path between network M and network N still forwards along the original path, a large amount of data messages will be discarded. Currently, the existing solution for refreshing single ring address is: the topology change points periodically send address refresh messages to solve the above problem, which solution for refreshing single ring address will now be described particularly in the following.

When a port of a node on the ring network receives a protocol message which carries the address refresh information, the port will extract <Node_ID, BPR> information from the protocol message. The port compares the <Node_ID, BPR> information in the message with the <Node_ID, BPR> information previously stored in the port. If inconsistent, the port would delete the previously stored <Node_ID, BPR> and store the new <Node_ID, BPR>. If the newly stored <Node_ID, BPR> is inconsistent with the <Node_ID, BPR> stored by another port of this on-ring node, then the node refreshes the address forwarding table, wherein parameter Node_ID in the <Node_ID, BPR> information is the information of the node which sends this protocol message; parameter BPR is used for indicating which on-ring port of this node sending the protocol message is blocked and can also be understood as the information of the port of the node which sends the protocol message, and parameter BPR is only of local meaning, and only represents what port of this on-ring node is blocked and it does not need to number this port globally.

The above solution well solves the problem of repeated refresh caused by periodically sending the message which carries address refresh information, i.e. the problem of the address forwarding table being refreshed repeatedly due to the subsequent address refresh messages. However, this solution is unable to completely eliminate the problem of the address being refreshed repeatedly. As shown in FIG. 4, link <B, C> is failed, node C sends message SF1 along its port w and message SF1 contains <Node_ID (C), e> information; node B sends message SF2 along its port e and message SF2 contains <Node_ID(B), w> information. When receiving message SF1 for the first time, the port e of nodes D, E, F and A on the ring finds that the <Node_ID (C), e> in SF1 is different from the <Node_ID, BPR> stored in their ports e and w, then it refreshes the address forwarding table. Likewise, when receiving message SF2 for the first time, the port w of nodes D, E, F and A on the ring finds that the <Node_ID (B), w> in SF2 is different from the <Node_ID, BPR> stored in their ports w and e, then it refreshes the address forwarding table. It can be seen that after nodes C, D, E, F, A, and B on the ring receive messages SF1 message and SF2 message for the first time, since different ports on the same node (i.e. ports e and w) all have to judge whether to refresh the address forwarding table, the same node needs to refresh the address forwarding table twice at the ports on both sides in the situation that the judgment is passed.

It can be seen from the above example that one topology change on the ring will cause the same node on the ring to refresh the address forwarding table twice in the currently available solution, and this situation will cause the ring network difficult to enter stable state from the broadcast storm state in short time. Moreover, since the protocol message is sent periodically, after nodes C, D, E, F, A, and B on the ring first receive messages SF1 and SF2, they will receive messages SF1 and SF2 regularly and make the same judgment as above, that is, the address forwarding table needs to be refreshed more than once. As to the above problem in the relevant art, no effective solution has been proposed yet.

SUMMARY OF THE INVENTION

In view of this situation, the present invention is to provide a method and system for refreshing the single ring address of an Ethernet ring so as to reduce the number of refreshes of the address forwarding table and improve the efficiency and stability of Ethernet ring protection, thus promoting the performance of the Ethernet ring.

In order to achieve the above aim, according to one aspect of the present invention, a method for refreshing a single ring address of an Ethernet ring is provided.

The method for refreshing a single ring address of an Ethernet ring according to the present invention comprises: achieving address refresh on an on-ring port at one side of a same node by the control of a refresh timer.

Preferably, in the situation that a protocol message which carries an address refresh information is received on a current on-ring port of a node, the step of achieving address refresh includes:
achieving the address refresh of the current on-ring port based on the different control states of a first refresh timer when it is analyzed that the address refresh information carried by the protocol message is inconsistent with the address refresh information stored locally.

Preferably, the first refresh timer is a refresh timer on another on-ring port at the other side of the node.

Preferably, when the control state of the first refresh timer is "being un-started state", the step of achieving the address refresh of the current on-ring port includes: the current on-ring port starting a second refresh timer local thereof and simultaneously refreshing an address forwarding entry associated with the current on-ring port; or, when the control state of the first refresh timer is "being started but not overtime state", the step of achieving the address refresh of the current on-ring port includes: stopping the first refresh timer and simultaneously refreshing an address forwarding entry associated with the current on-ring port; or, when the control state of the first refresh timer is "being started and overtime state", the step of achieving the address refresh of the current on-ring port includes: stopping the first refresh timer and stopping refreshing an address forwarding entry associated with the current on-ring port.

Preferably, in the situation that the current on-ring port of the node becomes blocked, the step of achieving address refresh includes:
refreshing an address forwarding entry associated with the blocked current on-ring port and starting the refresh timer on the blocked current on-ring port.

Preferably, in the situation that the refresh timer on the current on-ring port of the node is overtime, the step of achieving address refresh includes: refreshing an address forwarding entry associated with another on-ring port at the other side of the node.

In order to achieve the above aim, according to one aspect of the present invention, a system for refreshing a single ring address of an Ethernet ring is provided.

The system for refreshing a single ring address of an Ethernet ring according to the present invention comprises: an address refresh achieving unit configured to achieve address refresh on an on-ring port at one side of a same node by the control of a refresh timer.

Preferably, in the situation that a current on-ring port of the node receives a protocol message which carries the address refresh information, the address refresh achieving unit is further configured to achieving the address refresh of the current on-ring port based on the different control states of a first refresh timer when it is analyzed that the address refresh information carried by the protocol message is inconsistent with the address refresh information stored locally.

Preferably, the first refresh timer is a refresh timer on another on-ring port at the other side of the node.

Preferably, the address refresh achieving unit further comprises: a state indicating module and an address refresh achieving module; preferably, the state indicating module is configured to indicate the control state of the first refresh timer is "been un-started state" and inform the address refresh achieving module; and the address refresh achieving module is configured to acquire the "being un-started state", and start a second refresh timer local on the current on-ring port and simultaneously refreshing an address forwarding entry associated with the current on-ring port; or, the state indicating module is configured to indicate the control state of the first refresh timer is "been started but not overtime state" and inform the address refresh achieving module; and the address refresh achieving module is configured to acquire the "being started but not overtime state", stop the first refresh timer, and simultaneously refresh an address forwarding entry associated with the current on-ring port; or, the state indicating module is configured to indicate the control state of the first refresh timer is "being started and overtime state" and inform the address refresh achieving module; and the address refresh achieving module is configured to acquire the "being started and overtime state", stop the first refresh timer, and stop refreshing an address forwarding entry associated with the current on-ring port.

Preferably, in the situation that a current on-ring port of the node becomes blocked, the address refresh achieving unit is further configured to refresh an address forwarding entry associated with the blocked current on-ring port and start the refresh timer on the blocked current on-ring port.

Preferably, in the situation that the refresh timer on a current on-ring port of the node is overtime, the address refresh achieving unit is further configured to refresh an address forwarding entry associated with another on-ring port at the other side of the node.

The present invention achieves address refresh on an on-ring port at one side of the same node by the control of a refresh timer.

By virtue of the present invention, address refresh on the on-ring port at one side of the same node is achieved by the control of the refresh timer, which is different from the prior art in which the address refresh is performed on the ports at both sides of the same node. This novel solution for refreshing Ethernet ring address of the present invention reduces the number of refreshes of address forwarding table, thus reducing the repeated refresh phenomena of on-ring nodes caused by topology change, which can reduce the phenomena of the unstable network caused by the link switch refreshing the address more than once on the ring network. In summary, the present invention improves the efficiency and stability of Ethernet ring protection, thus greatly promoting the performance of Ethernet ring.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

Considering the phenomena of the unstable network caused by the link switch refreshing the address more than once on the ring network, the present invention provides a method and system for refreshing single ring address in the Ethernet ring protection.

The basic concept of the present invention is as follows: achieving address refresh on an on-ring port at one side of the same node by the control of a refresh timer.

The implementation of the technical solutions will now be further described in detail hereinafter in conjunction with the accompanying drawings.

There is provided a method for refreshing the single ring address of an Ethernet ring, which method comprises: achieving address refresh on an on-ring port at one side of the same node by the control of a refresh timer.

When the factors which cause the network topology of the Ethernet to change are different, the implementation of this method particularly includes three situations, which will be described respectively in the following.

The first situation: a current on-ring port of a node receives a protocol message which carries address refresh information.

Figure 1:
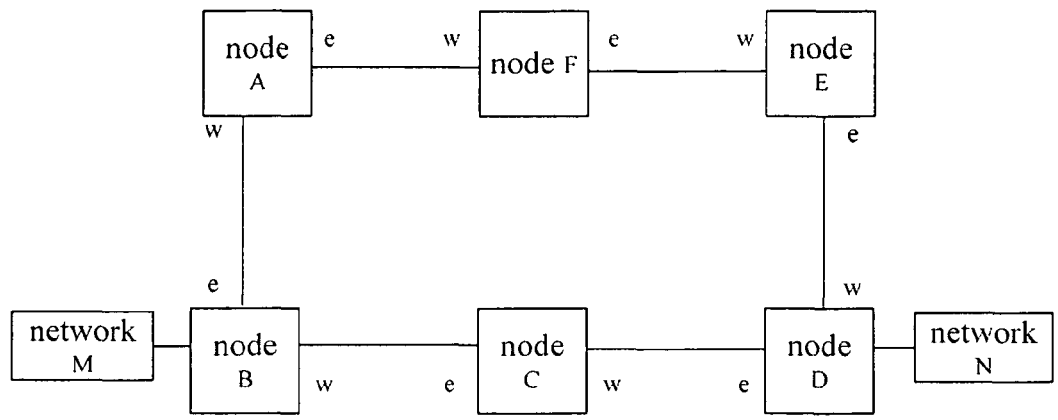
FIG. 1 is a schematic diagram of the topology of an Ethernet ring in the prior art.
Figure 2:
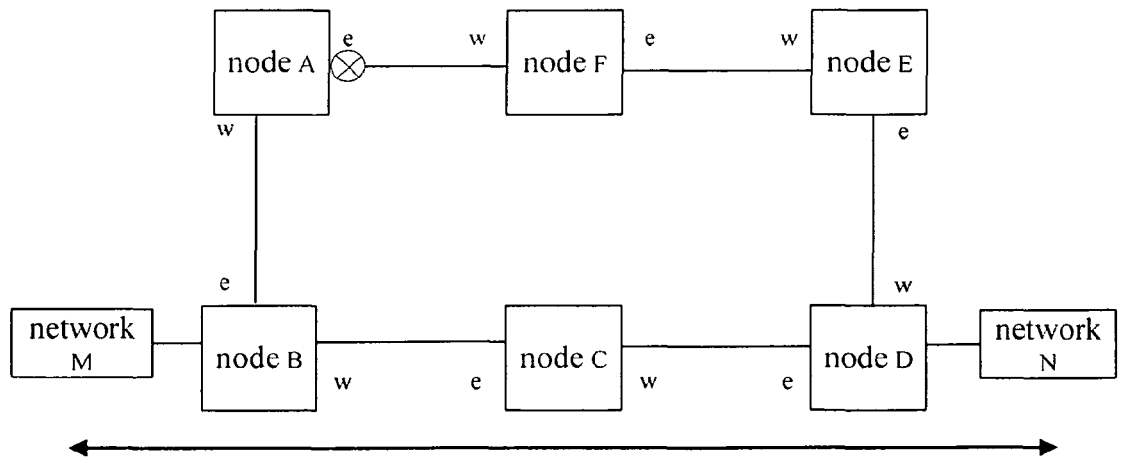
FIG. 2 is a schematic diagram of the topology of a communication path when the links in the Ethernet ring are intact in the prior art.
Figure 3:
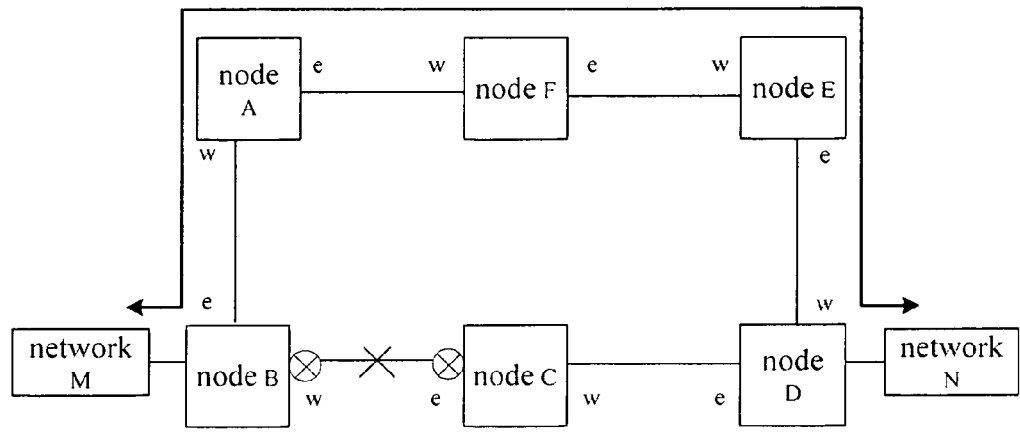
FIG. 3 is a schematic diagram of the topology of a communication path when a link in the Ethernet ring is failed in the prior art.
Figure 4:
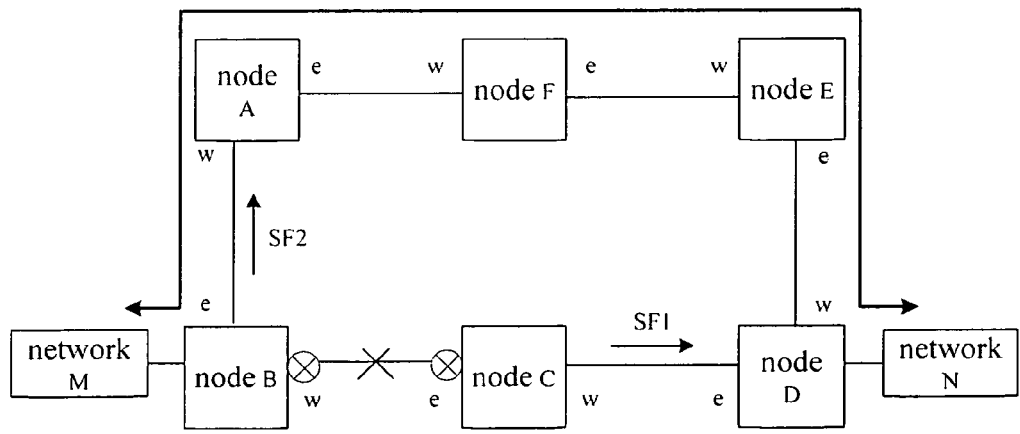
FIG. 4 is a schematic diagram of the topology of a communication path when a link in the Ethernet ring is failed in the prior art.
Figure 5:
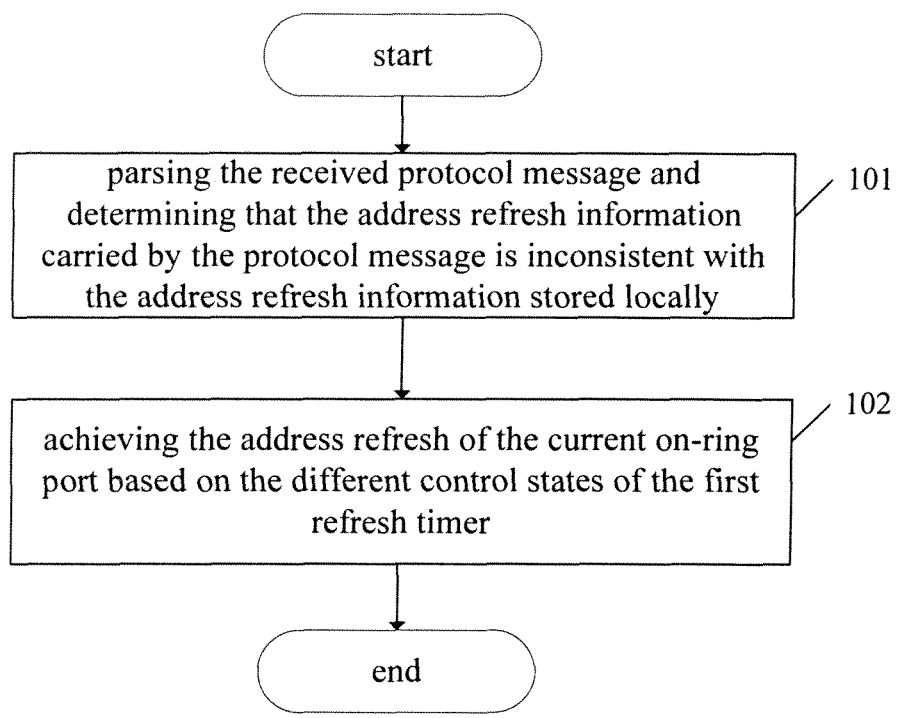
FIG. 5 is a schematic diagram of the implementing procedure of a method according to an embodiment of the present invention.

FIG. 5 is a schematic diagram of the implementing procedure of a method according to an embodiment of the present invention.

In the situation that a current on-ring port of a node receives a protocol message which carries address refresh information, as shown in FIG. 5, the achievement of the address refresh on an on-ring port at one side of the same node by the control of a refresh timer includes the following steps.

Step 101: parsing the received protocol message and determining that the address refresh information carried by the protocol message is inconsistent with the address refresh information stored locally.

Here, the address refresh information can include the identification information of the address refresh information, and the identification information of the address refresh information can be <Node_ID, BPR> information so as to identify what port of what node the corresponding address refresh information belongs to.

Step 102: achieving the address refresh of the current on-ring port based on the different control states of the first refresh timer.

Preferably, the first refresh timer is a refresh timer on another on-ring port at the other side of the node.

Here, based on the different control states of the first refresh timer on another on-ring port, the achievement of the address refresh on the on-ring port at one side of the same node by the control of the refresh timer includes three particular implementations, which will be described respectively hereinafter.

The first particular implementation: the current on-ring port at one side of the node checks the control state of the refresh timer on another on-ring port at the other side of the same node, and at this moment, the control state of the first refresh timer on another on-ring port is un-started.

When the first refresh timer on another on-ring port is in the un-started state, achieving the address refresh of the current on-ring port in particular includes: the current on-ring port starting a second refresh timer local thereof and simultaneously refreshing an address forwarding entry associated with this current on-ring port.

Here, it should be noted that for the convenience of differentiating different refresh timers on the current on-ring port and another on-ring port, the refresh timer on another on-ring port is referred to as the first refresh timer; and the refresh timer on the current on-ring port is referred to as the second refresh timer. The address forwarding entries actually are individual entries in the address forwarding table. The first refresh timer, second refresh timer and address forwarding entry, as related in the following, are also of the meaning here, which will not be described redundantly hereinafter.

The second particular implementation: the current on-ring port at one side of the node checks the control state of the refresh timer on another on-ring port at the other side of the same node, and at this moment, the control state of the first refresh timer on another on-ring port is "being started but not overtime".

When the control state of the first refresh timer on another on-ring port is "being started but not overtime", achieving the address refresh of the current on-ring port in particular includes: stopping the first refresh timer on another on-ring port and simultaneously refreshing an address forwarding entry associated with the current on-ring port.

The third particular implementation: the current on-ring port at one side of the node checks the control state of the refresh timer on another on-ring port at the other side of the same node, and at this moment, the control state of the first refresh timer on another on-ring port is "being started and overtime".

When the control state of the first refresh timer on another on-ring port is "being started and overtime", achieving the address refresh of the current on-ring port in particular includes: stopping the first refresh timer on another on-ring port and stopping refreshing an address forwarding entry associated with the current on-ring port.

The second situation: the current on-ring port of the node becomes blocked.

In the situation that the current on-ring port of the node becomes blocked, achieving address refresh on the on-ring port at one side of the same node by the control of refresh timer in particular includes: the node refreshing an address forwarding entry associated with the blocked current on-ring port and starting the refresh timer on the blocked current on-ring port.

The third situation: the refresh timer on the current on-ring port of the node is overtime.

In the situation that the refresh timer on the current on-ring port of the node is overtime, achieving address refresh on the on-ring port at one side of the same node by the control of refresh timer in particular includes: refreshing an address forwarding entry associated with another on-ring port at the other side of the node.

In summary, the present invention mainly includes the following contents:

when a current on-ring port of an on-ring node on the Ethernet ring receives a protocol message which carries address refresh information, the current on-ring port extracts <Node_ID, BPR> information from the protocol message, wherein the <Node_ID, BPR> information is the address refresh information; the <Node_ID, BPR> information in the protocol message is compared with the <Node_ID, BPR> information previously stored in the current on-ring port, wherein if inconsistent, the new <Node_ID, BPR> is stored on the current on-ring port and the previously stored <Node_ID, BPR> is deleted.

If another on-ring port of the on-ring node does not start a refresh timer (FT), then the current on-ring port of the on-ring node starts the FT and refreshes an address forwarding entry associated with the current on-ring port; if another on-ring port of the on-ring node starts the FT and it is not overtime, then it stops the FT on another on-ring port of the on-ring node and refresh an address forwarding entry associated with the current on-ring port; and if another on-ring port of the on-ring node starts the refresh timer and it is overtime, it stops the FT on another on-ring port.

If the FT on the on-ring port of the on-ring node is overtime, i.e. when it reaches a provided threshold value, then another on-ring port of the on-ring node refreshes an address forwarding entry associated with the another on-ring port.

If the on-ring node blocks one on-ring port thereof, then this on-ring node refreshes an address forwarding table associated with this blocked on-ring port and starts the FT on this blocked on-ring port.

Method embodiment: it includes the situations that a current on-ring port of a node receives a protocol message which carries address refresh information, the current on-ring port of the node becomes blocked, and the refresh timer on the current on-ring port of the node is overtime.

Step 400, the discussion is made according to the above three situations, wherein when a current on-ring port of a node receives the protocol message, it goes to step 401; when the current on-ring port of the node becomes blocked, it goes to step 410; and when the timer of the current on-ring port of the node is overtime, then it goes to step 411.

Step 401, the current on-ring port of the node on the Ethernet ring receives a protocol message, forwards the protocol message to the next node, and simultaneously analyzes this protocol message.

Step 402, the current on-ring port analyzes whether the protocol message carries the address refresh information, and if it carries the address refresh information, the flow goes to step 403, otherwise nothing is processed.

Step 403, the current on-ring port analyzes whether the <Node_ID, BPR> information carried by the protocol message is consistent with the <Node_ID, BPR> previously stored thereof and if inconsistent, then it goes to step 404, otherwise nothing is processed.

Step 404, the current on-ring port refreshes an address forwarding entry associated with the current on-ring port, stores the new <Node_ID, BPR>, and deletes the previous <Node_ID, BPR>.

Step 405, after refreshing the address forwarding entry associated with the current on-ring port, the current on-ring port checks whether another on-ring port of the node which possesses the current on-ring port starts the FT, if not start, then it goes to step 406, otherwise it goes to step 407.

Step 406, the current on-ring port starts the FT and refreshes an entry of the address forwarding table associated with the current on-ring port.

Step 407, it is judged whether the FT of another on-ring port is overtime, and if not overtime, then it goes to step 408, otherwise it goes to step 409.

Step 408, the FT on another on-ring port is stopped and an entry of the address forwarding table associated with the current on-ring port is refreshed.

Step 409, the FT on another on-ring port is stopped, the current address refresh procedure is ended, and refreshing an entry of the address forwarding table associated with the current on-ring port is stopped.

Step 410, an address forwarding entry associated with the blocked current on-ring port is refresh and the FT on the blocked current on-ring port is started.

Step 411. an address forwarding entry associated with another on-ring port of the node which possesses the current on-ring port is refreshed.

It can be seen from the above that the novel solution for refreshing Ethernet ring address of the present invention can be applied to reduce the phenomena of the unstable network of the ring network caused by the link switch refreshing the address more than once, and to greatly improve network performance.

Example I

Figure 6:
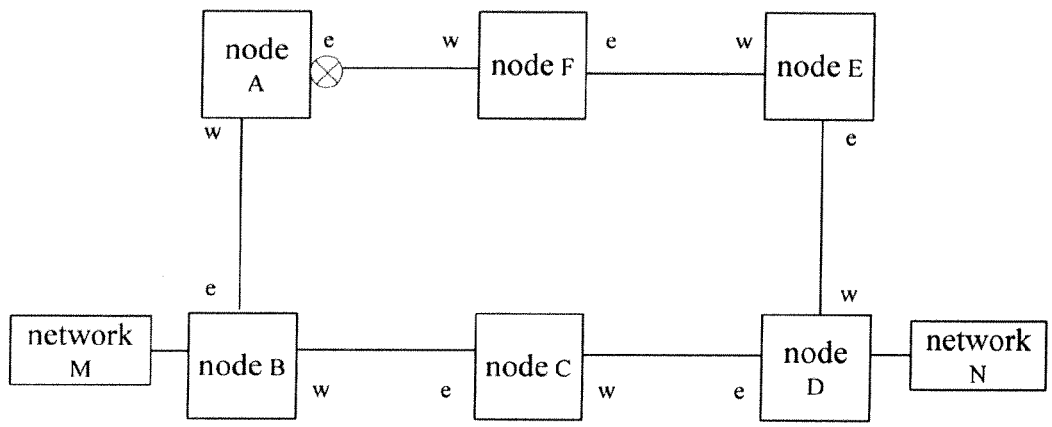
FIG. 6 is a schematic diagram of the topology of a communication path when the links are intact according to an example of the present invention.
Figure 7:
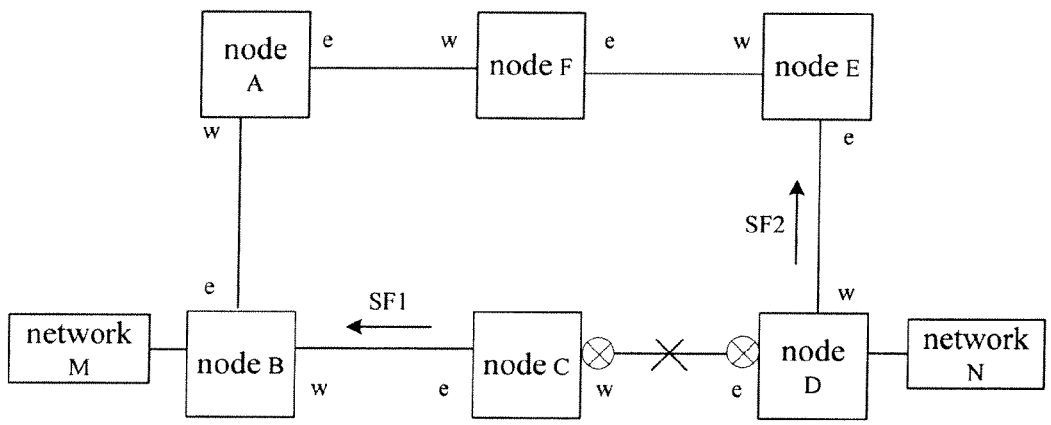
FIG. 7 is a schematic diagram of the topology of a communication path when a link is failed according to an example of the present invention.

FIGS. 6 and 7 show the present example, which is a particular example of the present invention in the situation that the ring network is failed.

FIG. 6 is a schematic diagram of the topology of a communication path when the links are intact according an example of the present invention.

As shown in FIG. 6, the ring network includes nodes A, B, C, D, E, and F and links <A,B>, <B, C>, <C, D>, <D, E>, <E, F>, and <F, A>. Node A is a control node and link <F, A> which is directly connected to the port e of the node A is a ring protection link, and the port e of node A blocks the forwarding of data messages in the normal situation.

FIG. 7 is a schematic diagram of the topology of a communication path when a link is failed according an example of the present invention.

As shown in FIG. 7, link <C, D> of the ring network is failed, and node C refreshes the MAC address associated with port w, and simultaneously starts the FT on port w and periodically sends message SF1 along port e, in which the message SF1 carries address refresh information and <Node_ID (C), w> information corresponding to the address refresh information. Node D refreshes the MAC address associated with port e, and simultaneously starts the FT on port e and periodically sends message SF2 along port w, in which the message SF2 carries address refresh information and <Node_ID (D), e> information.

Generally, on-ring node F is selected to be analyzed. It is assumed that port w of node F first receives message SF1 and reads the <Node_ID (C) w> information in message SF1. If the information is inconsistent with the <Node_ID, BPR> previously stored by port w, then port w of node F stores the <Node_ID (C) w> information and deletes the previous <Node_ID, BPR> information. Node F detects that its port e does not start the FT, and node F refreshes an address forwarding entry associated with port w and simultaneously starts the FT on port w. After a period of time, node F receives message SF2 from its port e and reads the <Node_ID (D), e> information in the message SF2; if this information is inconsistent with the <Node_ID, BPR> previously stored by port e, then port e of node F stores the <Node_ID (D), e> information and deletes the previous <Node_ID, BPR> information. Node F detects that its port w starts the FT, and if this FT is not overtime, then node F refreshes an address forwarding entry associated with its port e and stops the FT started by port w, otherwise it only stops the FT started by port w.

Regarding the above situation, it should be noted that node F first receives message SF1 from port w, starts the FT on port w, and then receives message SF2 from port e. If the timer FT on port w is overtime, then it only stops the FT started by port w at this moment. Another situation will be described hereinafter.

Another situation is as follows: if the FT of node F on port w is overtime, then the node refreshes an address forwarding entry associated with port e. Regarding this situation, it should be noted that node F detects that the FT on port w is overtime but has not received the message SF2 from port e, then the node refreshes an address forwarding entry associated with port e at this moment, but herein the FT is not stopped and still goes on, with the purpose of preventing that port e is not refreshed due to not receiving message SF2 for a long time. The following embodiment II has another situation that is the same as the above, which will not be described redundantly hereinafter.

Example II

Figure 8:
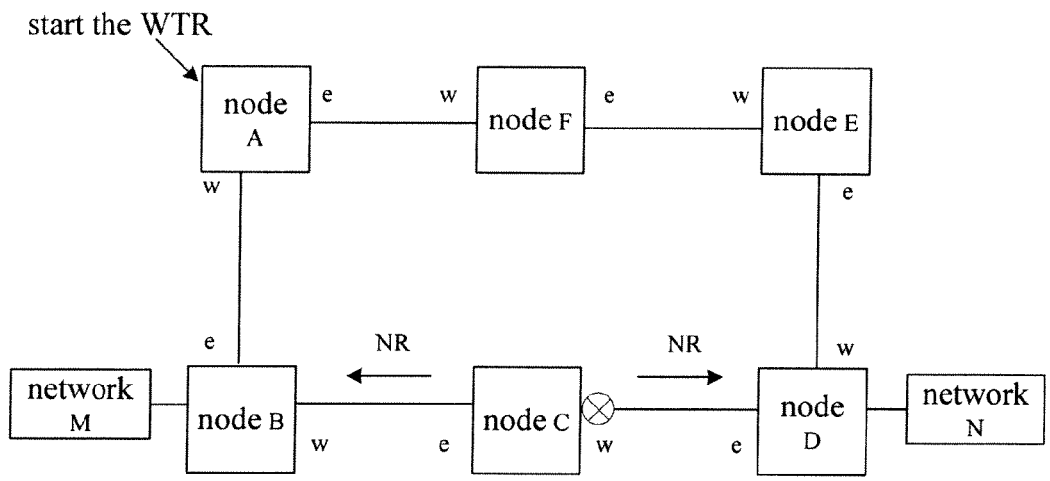
FIG. 8 is a schematic diagram of the topology of a communication path when the link is recovered from the failure according to another example of the present invention.
Figure 9:
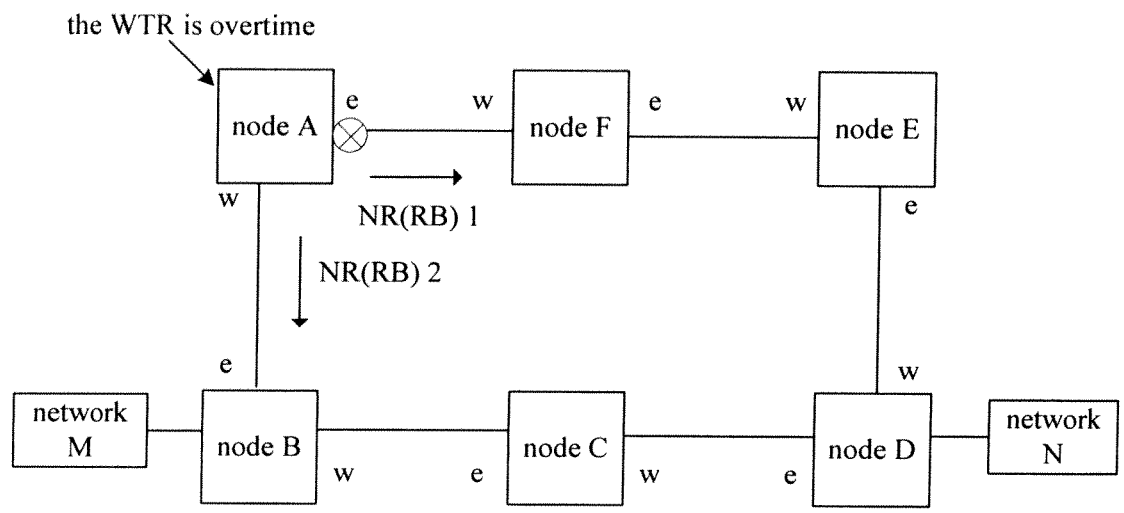
FIG. 9 is a schematic diagram of the topology of a communication path when the link is recovered from the failure according to another example of the present invention.

FIGS. 8 and 9 show the present example, which is a particular example of the present invention in the situation that the ring network is recovered from failure.

FIG. 8 is a schematic diagram of the topology of a communication path when the link is recovered from failure according another example of the present invention.

As shown in FIG. 8, when the failure of link <C, D> of the ring network disappears, node C sends a non-request message (i.e. NR message) outwardly along its two intact ports periodically, which message carries Node C parameter. Node D sends a NR message outwardly along its two intact ports periodically, which message carries node D parameter. Node D receives from node C the NR message which carries node C parameter and finds that the Node Number of the node C in the message is greater than its own node number, then node D activates the data message forwarding function of its own port e and stops sending the NR message which carries Node D parameter. Node A receives the NR message sent by node C or node D and starts the time waiting timer (WTR).

FIG. 9 is a schematic diagram of the topology of a communication path when the link is recovered from failure according another example of the present invention.

As shown in FIG. 9, when the WTR is overtime, node A refreshes the MAC address associated with port e, and simultaneously starts the FT on port e and sends a NR (RB) 1 message periodically along port e, which message carries the address refresh information and <Node_ID (A), e> information, and simultaneously sends a NR (RB) 2 message periodically along port w, which message carries the address refresh information and <Node_ID (A), e> information.

Generally, on-ring node E is selected to be analyzed. If the port w of the on-ring node E first receives NR (RB) 1 message and it reads the <Node_ID (A), e> information in the NR (RB) 1 message. If this information is inconsistent with the <Node_ID, BPR> previously stored by port w, then port w of node E stores the <Node_ID (A), e> information and deletes the previous <Node_ID, BPR > information. Node E checks whether its port e starts the FT, and if the FT is started and not overtime then it stops the FT started on port e. Node F refreshes an address forwarding entry associated with port w and simultaneously starts the FT on port w.

After a period of time, node E receives NR (RB) 2 message from its port e and reads the <Node_ID (D), e> information in the NR (RB) 2 message. If this information is inconsistent with the <Node_ID, BPR> previously stored by port e, then port e of node E stores the <Node_ID (D), e> information and deletes the previous <Node_ID, BPR> information. Node E detects that its port w starts the FT, and if this FT is not overtime, then node E refreshes an address forwarding entry associated with its port e and stops the FT started by port w, otherwise it only stops the FT started by port w. Another situation will be described hereinafter.

Another situation is as follows: if the FT of node E on port w is overtime, then the node refreshes an address forwarding entry associated with port e.

In summary, the present invention proposes a new solution for refreshing single ring address. It can be seen from the above description that the present invention reduces the phenomena of repeated refresh caused by the change of topology, and greatly improves network performance.

There is provided a system for refreshing the single ring address of an Ethernet ring, which system comprises: an address refresh achieving unit configured to achieve address refresh on an on-ring port at one side of the same node by the control of a refresh timer.

When the factors which cause the network topology of the Ethernet to change are different, the particular implementation of the address refresh achieving unit includes three situations, which will be described respectively in the following.

First situation: in the situation that a current on-ring port of a node receives a protocol message which carries address refresh information, the address refresh achieving unit is further configured to achieve the address refresh of the current on-ring port based on the different control states of a first refresh timer when it is analyzed that the address refresh information carried by the protocol message is inconsistent with the address refresh information stored locally. Herein, the first refresh timer is a refresh timer on another on-ring port at the other side of the node.

Here, based on the different control states of the first refresh time on another on-ring port, the achievement of the address refresh on the on-ring port at one side of the same node by the control of the refresh timer includes three particular implementations, that is, the address refresh achieving unit includes three particular implementations, which will be described respectively hereinafter.

The first particular implementation: the address refresh achieving unit further includes: a state indicating module and an address refresh achieving module. Herein, the state indicating module is configured to indicate the control state of the first refresh timer is "being un-started state" and inform the address refresh achieving module. The address refresh achieving module is configured to acquire the "being un-started state", and start the second refresh timer local on the current on-ring port and simultaneously refreshes an address forwarding entry associated with the current on-ring port.

The second particular implementation: the address refresh achieving unit further includes: a state indicating module and an address refresh achieving module. Herein, the state indicating module is configured to indicate the control state of the first refresh timer is "being started but not overtime state" and inform the address refresh achieving module. The address refresh achieving module is configured to acquire the "being started but not overtime" state, stop the first refresh timer, and simultaneously refreshing an address forwarding entry associated with the current on-ring port.

The third particular implementation: the address refresh achieving unit further includes: a state indicating module and an address refresh achieving module. Herein, the state indicating module is configured to indicate the control state of the first refresh timer is "being started and overtime state" and inform the address refresh achieving module. The address refresh achieving module is configured to acquire the "being started and overtime state", stop the first refresh timer, and simultaneously refresh an address forwarding entry associated with the current on-ring port.

The second situation: in the situation that the current on-ring port of the node becomes blocked, the address refresh achieving unit is further configured to refresh an address forwarding entry associated with the blocked current on-ring port and start the refresh timer on the blocked current on-ring port.

The third situation: in the situation that the refresh timer on the current on-ring port of the node is overtime, the address refresh achieving unit is further configured to refresh an address forwarding entry associated with another on-ring port at the other side of the node.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for refreshing a single ring address of an Ethernet ring, wherein the method comprises: achieving address refresh on an on-ring port at one side of a same node by a control of a refresh timer,
    wherein when a protocol message which carries an address refresh information is received by a current on-ring port of a node, the step of achieving address refresh comprises:
        achieving the address refresh of the current on-ring port based on different control states of a first refresh timer when it is analyzed that the address refresh information carried by the protocol message is inconsistent with the address refresh information stored locally, wherein the first refresh timer is a refresh timer of another on-ring port at the other side of the node.

2. The method according to claim 1, wherein when the control state of the first refresh timer is "being un-started state", the step of achieving the address refresh of the current on-ring port comprises:
    the current on-ring port starting a second refresh timer local thereof and simultaneously refreshing an address forwarding entry associated with the current on-ring port; or,
    when the control state of the first refresh timer is "being started but not overtime state", the step of achieving the address refresh of the current on-ring port includes:
    stopping the first refresh timer and simultaneously refreshing an address forwarding entry associated with the current on-ring port; or,
    when the control state of the first refresh timer is "being started and overtime state", the step of achieving the address refresh of the current on-ring port includes: stopping the first refresh timer and stopping refreshing an address forwarding entry associated with the current on-ring port.

3. The method according to claim 1, wherein when the current on-ring port of the node becomes blocked, the step of achieving address refresh comprises:
    refreshing an address forwarding entry associated with the blocked current on-ring port and starting the refresh timer on the blocked current on-ring port.

4. The method according to claim 1, wherein when the refresh timer on the current on-ring port of the node is overtime, the step of achieving address refresh comprises: refreshing an address forwarding entry associated with another on-ring port at the other side of the node.

5. A system for refreshing a single ring address of an Ethernet ring, wherein the system comprises: a processor configured to execute program units stored on a memory, the program units including an address refresh achieving unit configured to achieve address refresh on an on-ring port at one side of a same node by a control of a refresh timer,
    wherein when a current on-ring port of the node receives a protocol message which carries the address refresh information, the address refresh achieving unit is further configured to achieve the address refresh of the current on-ring port based on different control states of a first refresh timer when it is analyzed that the address refresh information carried by the protocol message is inconsistent with the address refresh information stored locally, wherein the first refresh timer is a refresh timer on another on-ring port at the other side of the node.

6. The system according to claim 5, wherein the address refresh achieving unit further comprises: a state indicating module and an address refresh achieving module; wherein
    the state indicating module is configured to indicate the control state of the first refresh timer is "been un-started state" and inform the address refresh achieving module; and the address refresh achieving module is configured to acquire the "being un-started state", start a second refresh timer local on the current on-ring port, and simultaneously refresh an address forwarding entry associated with the current on-ring port; or,
    the state indicating module is configured to indicate the control state of the first refresh timer is "been started but not overtime state" and inform the address refresh achieving module; and the address refresh achieving module is configured to acquire the "being started but not overtime state", stop the first refresh timer, and simultaneously refresh an address forwarding entry associated with the current on-ring port; or, the state indicating module is configured to indicate the control state of the first refresh timer is "being started and overtime state" and inform the address refresh achieving module; and the address refresh achieving module is configured to acquire the "being started and overtime state", stop the first refresh timer, and stop refreshing an address forwarding entry associated with the current on-ring port.

7. The system according to claim 5, wherein in the situation that a current on-ring port of the node becomes blocked, the address refresh achieving unit is further configured to refresh an address forwarding entry associated with the blocked current on-ring port and start the refresh timer on the blocked current on-ring port.

8. The system according to claim 5, wherein in the situation that the refresh timer on a current on-ring port of the node is overtime, the address refresh achieving unit is further configured to refresh an address forwarding entry associated with another on-ring port at the other side of the node.

* * * * *